(12) United States Patent
Janku et al.

(10) Patent No.: US 12,286,028 B2
(45) Date of Patent: Apr. 29, 2025

(54) BATTERY BLOCK MOVING ASSEMBLY

(71) Applicants: BattSwap Inc., Lewes, DE (US); Radek Janku, Prague (CZ)

(72) Inventors: Radek Janku, Prague (CZ); Antonin Korab, Liberec (CZ)

(73) Assignee: BattSwap Inc.

( * ) Notice: Subject to any disclaimer, the term of this patent is extended or adjusted under 35 U.S.C. 154(b) by 713 days.

(21) Appl. No.: 17/774,115

(22) PCT Filed: Jan. 30, 2020

(86) PCT No.: PCT/EP2020/052372
§ 371 (c)(1),
(2) Date: May 3, 2022

(87) PCT Pub. No.: WO2020/161004
PCT Pub. Date: Aug. 13, 2020

(65) Prior Publication Data
US 2022/0402398 A1    Dec. 22, 2022

(30) Foreign Application Priority Data
Feb. 6, 2019  (EP) .................................. 19155828

(51) Int. Cl.
*B60L 53/80*        (2019.01)
*B60S 5/06*         (2019.01)
(Continued)

(52) U.S. Cl.
CPC ................ *B60L 53/80* (2019.02); *B60S 5/06* (2013.01); *B66F 7/0658* (2013.01);
(Continued)

(58) Field of Classification Search
CPC ..... B60L 53/80; H01M 50/256; H01M 50/20; H01M 2220/20; B60S 5/06; B66F 7/0658
(Continued)

(56) References Cited

U.S. PATENT DOCUMENTS 8,164,300 B2    4/2012 Agassi et al.
2008/0258682 A1*  10/2008 Li ........................... B60L 50/66
                                                            320/109
(Continued)

FOREIGN PATENT DOCUMENTS

CN      102180143 B    1/2013
CN      106627513 A    5/2017
(Continued)

OTHER PUBLICATIONS

English translation of DE 2444711A accessed at IP.com on Jun. 14, 2024. (Year: 1976).*
(Continued)

*Primary Examiner* — James A Shriver, II
*Assistant Examiner* — Hilary L Johns
(74) *Attorney, Agent, or Firm* — von Briesen & Roper, s.c.

(57) ABSTRACT

A battery block moving assembly for handling and a manipulation with a battery block is described. The battery block moving assembly includes a trolley, a platform, a lift mechanism and a battery block moving mechanism. The battery block moving mechanism includes a pin and a horizontal pin moving mechanism configured to move the pin. The pin is configured to engage and move a battery block.

18 Claims, 7 Drawing Sheets

(51) Int. Cl.
*B66F 7/06* (2006.01)
*H01M 50/20* (2021.01)
*H01M 50/256* (2021.01)

(52) U.S. Cl.
CPC ......... *H01M 50/20* (2021.01); *H01M 50/256* (2021.01); *H01M 2220/20* (2013.01)

(58) Field of Classification Search
USPC ........................................................ 180/68.5
See application file for complete search history.

(56) References Cited

U.S. PATENT DOCUMENTS

| | | | |
|---|---|---|---|
| 2010/0071979 A1 | 3/2010 | Heichal et al. | |
| 2011/0303509 A1 | 12/2011 | Agassi et al. | |
| 2014/0027693 A1* | 1/2014 | Hallman | B66F 7/065 |
| | | | 254/8 C |
| 2018/0154789 A1* | 6/2018 | Janku | B66F 9/06 |
| 2020/0091744 A1* | 3/2020 | Väin | B60L 53/65 |
| 2022/0402398 A1* | 12/2022 | Janku | H01M 50/20 |

FOREIGN PATENT DOCUMENTS

| | | | |
|---|---|---|---|
| CN | 108177635 A | 6/2018 | |
| DE | 2410102 A1 | 9/1975 | |
| DE | 2444711 A * | 4/1976 | ............... B60K 1/04 |
| DE | 2444711 A1 | 4/1976 | |
| DE | 102009035253 A1 | 2/2011 | |
| FR | 2721559 A1 | 12/1995 | |
| FR | 2970224 A1 | 7/2012 | |
| WO | 2018215579 A1 | 11/2018 | |

OTHER PUBLICATIONS

International search report and written opinion related to Application No. PCT/EP2020/052372 reported on Apr. 28, 2020.
European Office Action related to Application No. 23206999.7; reported on Feb. 7, 2024.
European Office Action related to Application No. 20 701 661.9; reported on Feb. 6, 2023.

* cited by examiner

BATTERY BLOCK MOVING ASSEMBLY

CROSS-REFERENCE TO RELATED APPLICATION

This Application is a 35 USC § 371 US National Stage filing of International Application No. PCT/EP2020/052372 filed on Jan. 30, 2020 and claims priority under the Paris Convention to European Patent No. 19155828.7 filed on Feb. 6, 2019.

FIELD OF THE DISCLOSURE

The present disclosure relates to handling and manipulation with a battery block and describes an assembly for battery block displacement. The present disclosure further describes a battery storage and charge system and a battery exchange station utilizing the assembly for battery block displacement.

BACKGROUND OF THE DISCLOSURE

Growing interest in battery replacement technologies as a fast way to improve utilization of electric and hybrid vehicles has brought challenges in handling and manipulation of battery blocks powering such vehicles. The handling and manipulation of a battery block typically involves removal of a depleted battery from a vehicle, moving the depleted battery block from the vehicle to a dedicated battery storage area, collecting a charged battery block and moving it towards the electrical vehicle for battery block installation in the vehicle.

The battery exchange systems having storage areas often employs a storage subsystem utilizing plurality of complicated shape storage racks with shelfs and it conventionally employs a hybrid system for battery block manipulation. The hybrid system typically comprises of a dedicated manipulator to grasp and move battery to and from the shelf and a battery conveyance mechanism for moving the battery from and to the racks. Another approach to manipulate with battery blocks is for battery exchange system to utilize a dedicated portal lift mechanism to manipulate the batteries in a staging substation where the battery platforms are stored.

The battery blocks assemblies may weigh as much as 365 kilograms and their safe and efficient manipulation with such hybrid systems leads to slow, expensive, bulky and complex battery handling systems that bears reliability issues and occupies additional space needed for the overall battery storage and exchange.

SUMMARY OF THE DISCLOSURE

One objective of the present disclosure is to remedy at least part of these drawbacks.

According to various aspects of the present disclosure an exemplary embodiment of a battery block moving assembly is described. The battery block moving assembly includes a trolley having a top side and a bottom side spaced from the top side. The trolley is horizontally movable in a substantially horizontal first direction. The battery block moving assembly further includes a platform positioned on the top side of the trolley and having a first end, a second end spaced from the first end, and a top surface that extends in a substantially horizontal second direction perpendicular to the first direction between the first and second ends. The top surface is configured to support a battery block thereon. The battery block moving assembly further includes a lift mechanism disposed between the trolley and the platform. The lift mechanism is configured to move the platform relative to the trolley in a substantially vertical third direction perpendicular to both the first and the second direction. The battery block moving assembly further includes a battery block moving mechanism coupled to the platform and configured to move the battery block alongside the platform in the second direction. The battery block moving mechanism includes a pin and a horizontal pin moving mechanism configured to move the pin in the second direction along the top surface of the platform. The pin is configured to engage and move the battery block.

In various examples of the battery block moving assembly according to the present disclosure, one may possibly have recourse in addition to one and/or other of the following arrangements:
  the pin may extend outwards from the surface of the platform;
  the battery block moving assembly may further comprise a vertical pin moving mechanism configured to move the pin between an extended position and a retracted position, the pin may protrude on the surface of the platform when in the extended position and the pin may not protrude on the surface of the platform when in the retracted position;
  the lift mechanism may further comprise at least one scissor type lift comprising at least one pair of vertical scissor columns, each of the scissor columns may comprises at least one pair of arms pivotally movable relative to one another and at least one spring element having one end coupled with the platform and the second end coupled to one of the arms;
  the battery block moving assembly may further comprise a control unit adapted to control the trolley movement in the first direction and/or the second direction and the lift mechanism movement in the third direction;
  the top surface of the platform may comprise a plurality of rollers (21) adapted to rollably support the battery block;
  the battery block moving assembly may further comprise a trolley moving mechanism coupled to the trolley and adapted to move the trolley in the first direction;
  the battery block moving assembly may further comprise at least one rail extending in the first direction and the trolley moving mechanism may be adapted to move the trolley on the at least one rail in the first direction;
  the trolley the trolley may further comprise a plurality of wheels (12) adapted to rollably support the trolley on the at least one rail;
  the battery block moving assembly may further comprise two spaced apart parallel rails and the trolley may further comprise two sets of wheels arranged on opposite sides of the trolley. The sets of wheels may be configured to rollably support the trolley on the two rails.

Another exemplary embodiment of the present disclosure is directed to a battery storage and charge system. The system comprising at least one of the battery block moving assembly. The system further comprises at least one battery block and at least one rack having a plurality of shelves. Each shelf of the plurality of shelves is configured to receive and mechanically support the at least one battery block. The trolley moving mechanism of each of the at least one of the battery block moving assembly is adapted to move the trolley along the at least one rack and each shelf of the plurality of shelves is open toward the at least one rail in the first direction. The battery block moving mechanism of each of the at least one of the battery block moving assembly is adapted to transfer the at least one battery block from the top surface of the platform to the shelf and from the shelf to the top surface of the platform. The system further comprising at least one charging unit adapted to charge and communicate with the at least one battery block when the at least one battery block is received within one of the plurality of shelves.

In various examples of the battery storage and charge system to the present disclosure, one may possibly have recourse in addition to one and/or other of the following arrangements:

each shelf of the plurality of shelves may further comprise at least one battery block guide (26) configured to guide the battery block when being transferred to the shelf;

each shelf of the plurality of shelves may further comprise a plurality of rollers thereon, the plurality of rollers adapted to rollably support the battery block;

the at least one battery block may have a bottom portion having at least one opening and the at least one opening being sized to accept the pin;

the at least one assembly may further comprise at least one rail extending in the first direction and the at least one rail may form a pathway extending in the first direction, the system may have at least two of the racks separated by the pathway.

Another exemplary embodiment of the present disclosure is directed to a battery exchange station. The station comprising the battery storage and charge system. The station further comprising a ramp on which an electric vehicle can advance to the location of battery exchange in the second direction. The station further comprise a vehicle lane under which the at least one assembly moves in the first direction. The vehicle lane having an opening, the opening being adapted to give free passage to the battery block when the battery block is lifted in the third direction by the lift mechanism of the at least one assembly.

In various examples of the battery storage and exchange station to the present disclosure, one may possibly have recourse in addition to one and/or other of the following arrangements:

the at least one battery block moving assembly may further comprise at least one rail and the at least one rail extends under the vehicle lane;

the at least one battery block moving assembly may be adapted to move the at least one battery block to the position in the first and second direction horizontally corresponding the opening in the vehicle lane and extend in the third substantially vertical direction. The at least one battery block moving assembly may be configured to place the at least one battery block into a battery dock within the electrical vehicle or remove the at least one battery block from the electrical vehicle;

the vehicle lane may comprise a first side and a second side spaced from the first side in the first direction. The station may further include several racks close to respectively the first side and the second side of the vehicle lane, and the at least one rail may extend between the racks.

Further areas of applicability will become apparent from the description herein. The description and specific examples in the summary are intended for purposes of illustration only and are not intended to limit the scope of the present disclosure.

BRIEF DESCRIPTION OF THE DRAWINGS

Other features and advantages of the disclosure appear from the following detailed description of some of its embodiments, given by way of non-limiting example, and with reference to the accompanying drawings, in which.

DETAILED DESCRIPTION OF THE DISCLOSURE

The foregoing summary, as well as the following detailed description of certain examples will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In the figures, the same references denote identical or similar elements, unless stated otherwise. In the drawings, the size of each element or a specific portion constituting the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

Figure 1:
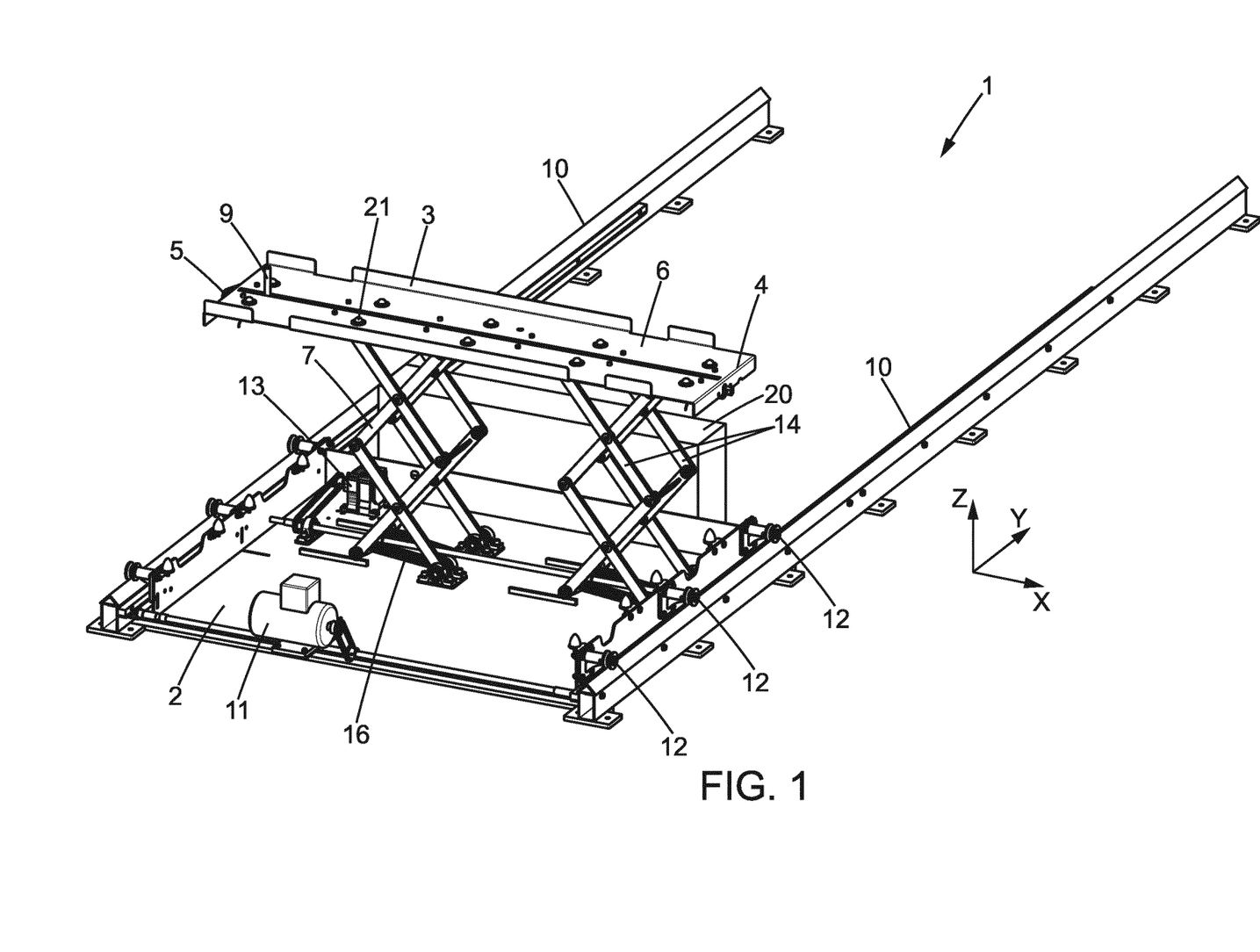
FIG. 1 illustrates a perspective view of a battery block moving assembly.

Referring to FIG. 1 depicting an exemplary embodiment of a battery block moving assembly 1 that may be used for moving and/or positioning of a battery block. The battery block moving assembly may include a trolley 2 a platform 3, a lift mechanism 7 and a battery block moving mechanism 8.

The trolley 2 may have a top side and a bottom side spaced from the top side. The trolley may be horizontally movable in a substantially horizontal first direction Y. The assembly may comprise a trolley moving mechanism 11 adapted to control the trolley movement in the first direction Y. The trolley moving mechanism 11 may be placed on the top side of the trolley 2 and may comprise a motor, for example an electrical, hydraulic or pneumatic motor, and a means to transfer the motor torque to a horizontal movement. Optionally the trolley moving mechanism may be a linear motor or a linear actuator or a combination thereof.

Figure 2:
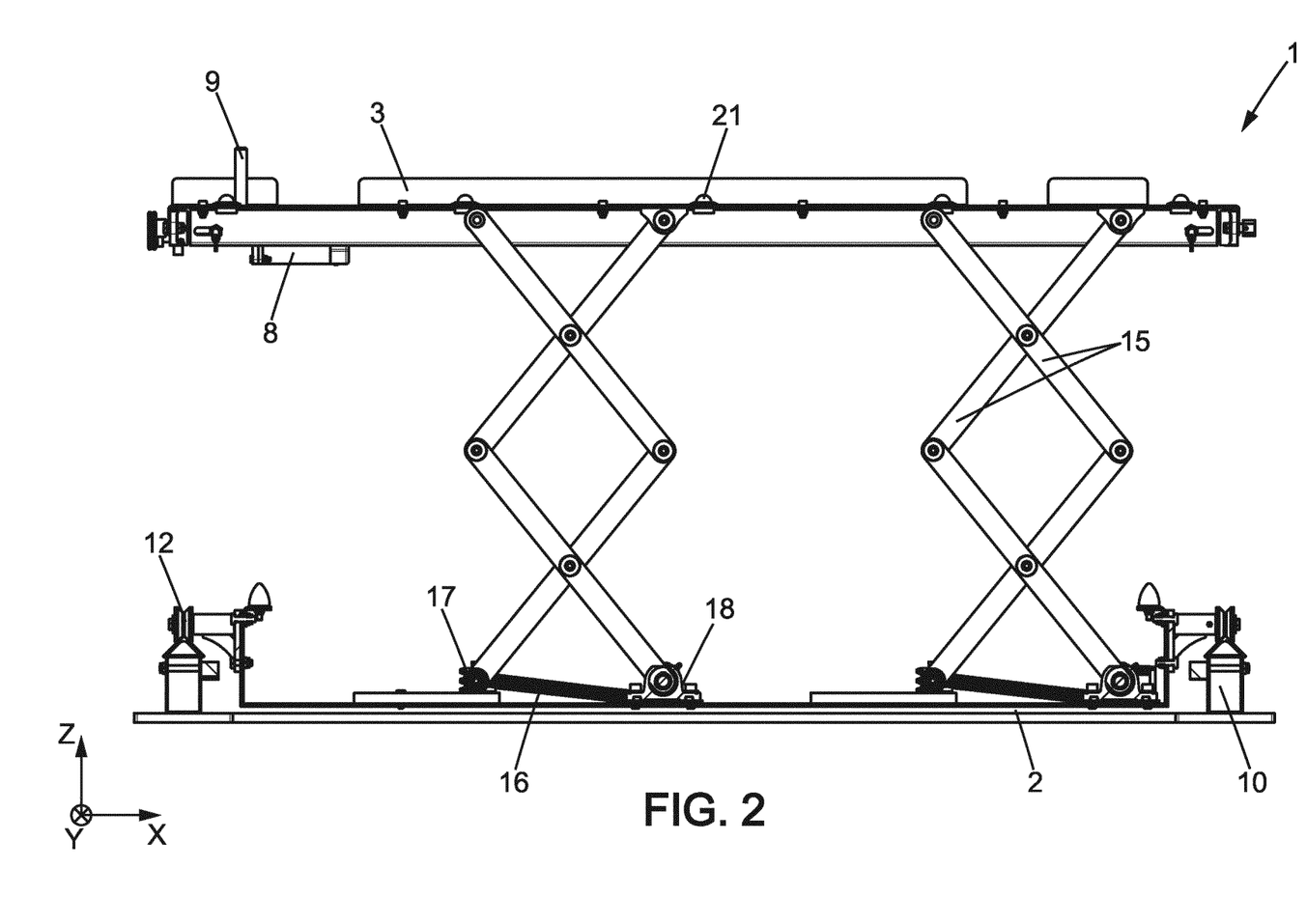
FIG. 2 illustrates an exemplary side view of a battery block moving assembly.

The battery block moving assembly may comprise one or more rails 10 extending in the first direction Y. The trolley moving mechanism 11 may be adapted to move the trolley 2 on the one or more rails in the first direction Y. The trolley may further comprise a plurality of wheels 12 adapted to rollably support the trolley. As depicted in FIG. 1 or 2 the battery block moving assembly may comprise two spaced apart parallel rails and the trolley may comprise two sets of wheels 10 arranged on opposite sides of the trolley. The sets of wheels may be configured to rollably support the trolley on the two rails. That way the wheel provides balanced support to the trolley. Instead of the rails other types of guides and/or support may be provided for instance a bar or a beam. The trolley may also be adapted to move directly on the floor in such case the plurality of wheels may directly interface with a floor rollably supporting movement of the trolley. The trolley may be also adapted to be connected to a moving belt or a conveyor extending in the first direction X. The moving belt or a conveyor would then cause movement of the trolley.

The platform 3 may be positioned on the top side of the trolley and has a first end 4 and a second end 5 spaced from the first end. The platform may further have a top surface 6 extending in substantially horizontal second direction X) perpendicular to the first direction Y) between the first and the second ends. The top surface of the platform may be configured to support a battery block thereon. The top surface may comprise plurality of rollers 21) adapted to reliably support the battery block. Alternatively the top surface may be configured as a slideable surface enabling the battery block to move freely on the top surface of the platform. For that the top surface of the platform may be coated or made of a slideable material.

The lift mechanism 7 may be disposed between the trolley 2 and the platform 3. The lift mechanism may be configured to move the platform relative to the trolley in a substantially vertical third direction Z perpendicular to both the first and the second direction. As shown on FIGS. 1 and 2 the lift mechanism may include at least one scissor type lift having at least one pair of vertical scissor columns 14. Each of the scissor columns may comprise at least one pair of arms 15 pivotally moveable relative to one another. Each of the scissor columns may comprise at least one spring element 16 having one end couple with the platform 2 and the second end 18 coupled to one of the arms. The lift mechanism 7 may utilize for its function one or more actuators 13. The one or more actuators may be a screw type actuator. The lift mechanism may utilize other types of linear actuator such as for instance pneumatic of hydraulic cylinder, telescopic linear actuator, chain actuator, linear motor, belt driven or a rack-and-pinion driven actuators. The spring element may include a conical, helical or volute spring it the compression or tension arrangement. The spring element may also include a gas spring.

The battery block moving mechanism 8 in FIG. 2 may be coupled to the platform and configured to move the battery block alongside the platform 2 in the second direction X. The battery block moving mechanism may include a pin 9 and a horizontal pin moving mechanism configured to move the pin in the second direction X along the top surface of the platform. The pin may be configured to engage and move the battery block. The pin may extend outwards from the top surface of the platform. Instead of the pin an alternative means to engage the battery block may be utilized. The alternative means to engage the battery block may be one or more of the following a belt, a conveyor belt, a jaw, a hook, a lock, a vise, a snap fit, a screw. There may be other means to engage the battery block. The battery moving mechanism may further comprise a vertical pin moving mechanism configured to move the pin 9 between an extended position and a retracted position. The pin may then protrude from the top surface 6 of the platform 2 when in an extended position and the pin may not protrude from the top surface of the platform when in the retracted position. The pin may have variety of shapes for instance it may be substantially round, square or oval. The horizontal pin moving mechanism 8 may comprise one or more actuators. The one or more actuators may be one of a pneumatic of hydraulic cylinder, telescopic linear actuator, chain actuator, linear motor, belt driven or screw driven actuator or a rack-and-pinion driven actuators.

The battery block moving assembly from FIG. 1 may also include a control unit 20 adapted to control the trolley movement in the first direction Y and/or in the second direction X and the lift mechanism movement in the third direction Z.

Figure 3:
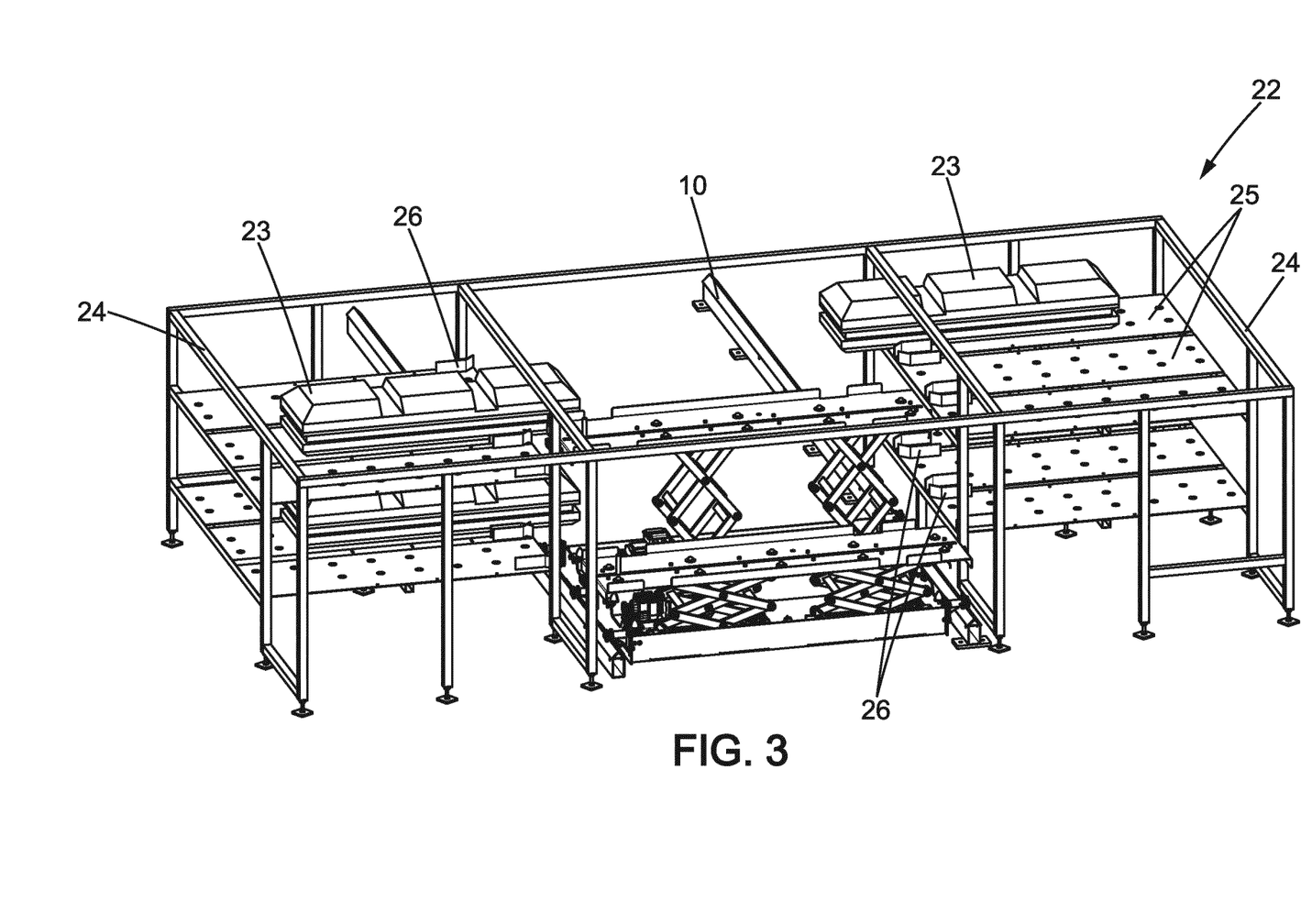
FIG. 3 illustrates a perspective view of a battery storage and charge system.
Figure 4:
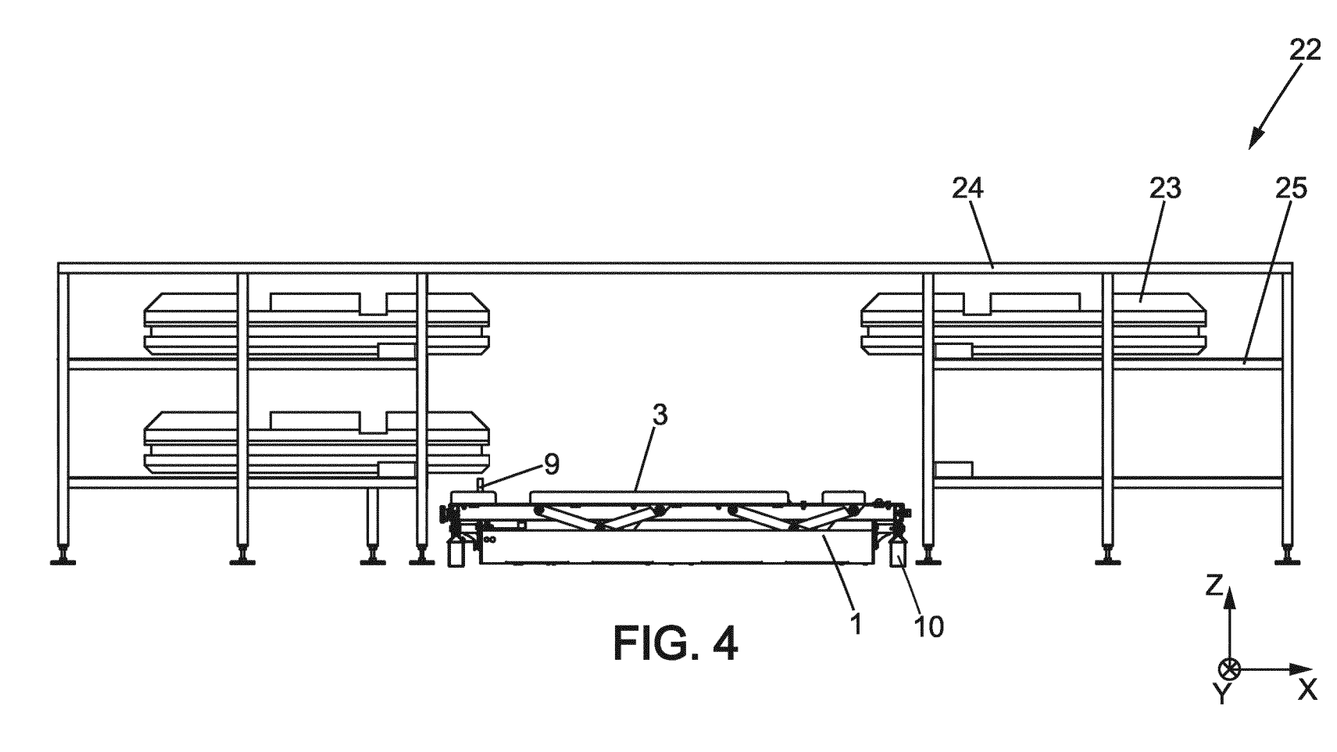
FIG. 4 illustrates an exemplary side view of a battery storage and charge system.

FIGS. 3 and 4 shows an exemplary embodiment of a battery storage and charge system 22. The battery storage and charge system may include the at least one battery moving assembly 1, at least one battery block 23, at least one rack 24 and at least one charging unit 26.

Figure 5:
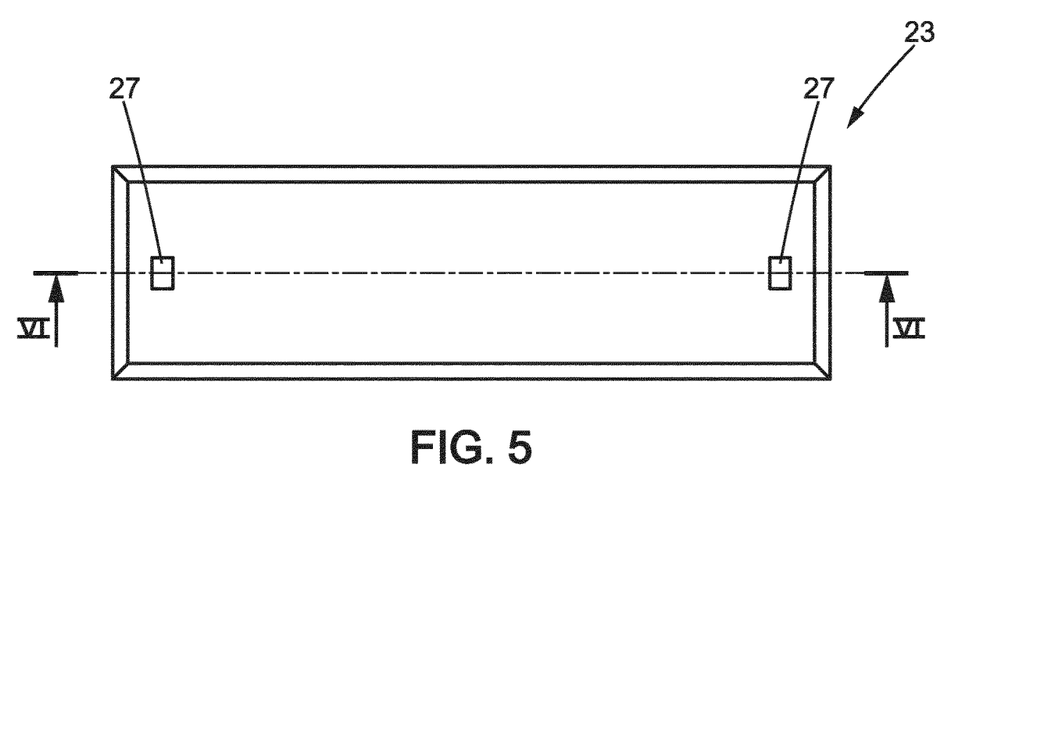
FIG. 5 illustrates a bottom view of a battery block.
Figure 6:
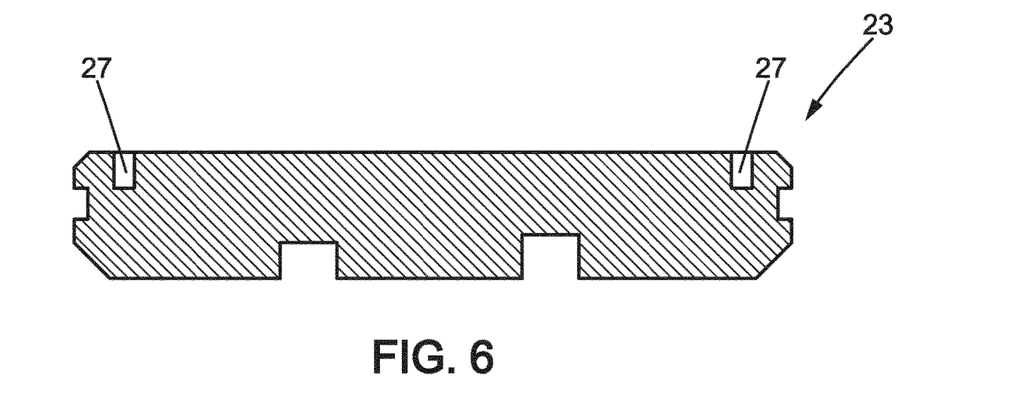
FIG. 6 illustrates a cross section of a battery block.

Referring to FIGS. 5 and 6 each of the at least one battery blocks 23 may have a bottom portion having at least one opening 27. Each of the at least one opening 27 may be sized to accept the pin 9 of the pin moving mechanism of the battery block moving assembly. The openings may each be made on opposite sides of each of the at least one battery block. The opening may be also made on one or both sides of the at least one battery block. The opening may have variety of shapes.

The at least one rack 24 may have a plurality of shelves 25 as best seen on FIG. 3 or 4. Each shelf of the plurality of shelves may be configured to receive and mechanically support the at least one battery block 23. At least one of the plurality of shelves may be further partitioned into plurality of partitions each sized to accommodate a battery block. The trolley moving mechanism of each of the at least one assembly may be adapted to move the trolley along the at least one rack. Each shelf of the plurality of shelves may be open toward the at least one rail in the first direction and the battery block moving mechanism 8 of each of the at least one assembly. The battery block moving mechanism 8 may be adapted to transfer the at least one battery block 23 from the top surface of the platform 3 of to the shelf 25 and from the shelf to the top surface of the platform. The each shelf 25 of the plurality of shelves may further comprise at least one battery block guide 26 configured to guide the at least one battery block 23 when being transferred to the shelf. The block guide may be positioned in proximity of the opening of the each shelf. The block guide may be located along one or both sides of the each shelf of the plurality of the shelves. The guides may be formed by a strip of metal, plastic or composite. The strip of metal may be bended so that its bended portion is configured to provide a directional guidance for the battery block during its placement via the opening onto the shelf of the plurality of shelves. Each shelf 25 of the plurality of shelves may further comprise a plurality of rollers 21 thereon. The plurality of rollers may be adapted to rollably support the battery block 23.

The at least one assembly 1 of the battery storage and charge system 22 may further comprise at least one rail 10. The at least one rail may extend in the first direction Y and the at least one rail may form a pathway 35 extending in the first direction. The battery storage and charge system 22 may then have at least two of the racks separated by the pathway. There may be plurality of the racks on each side of the pathway. The plurality of the racks may be separated from each other or connected to each other.

The at least one charging unit 26 may each be adapted to charge and communicate with the at least one battery block when the at least one battery block is received within one of the plurality of shelves. The at least one charging unit may each be adapted to charge only one battery block at a time or simultaneously charge multiple battery blocks.

Figure 7:
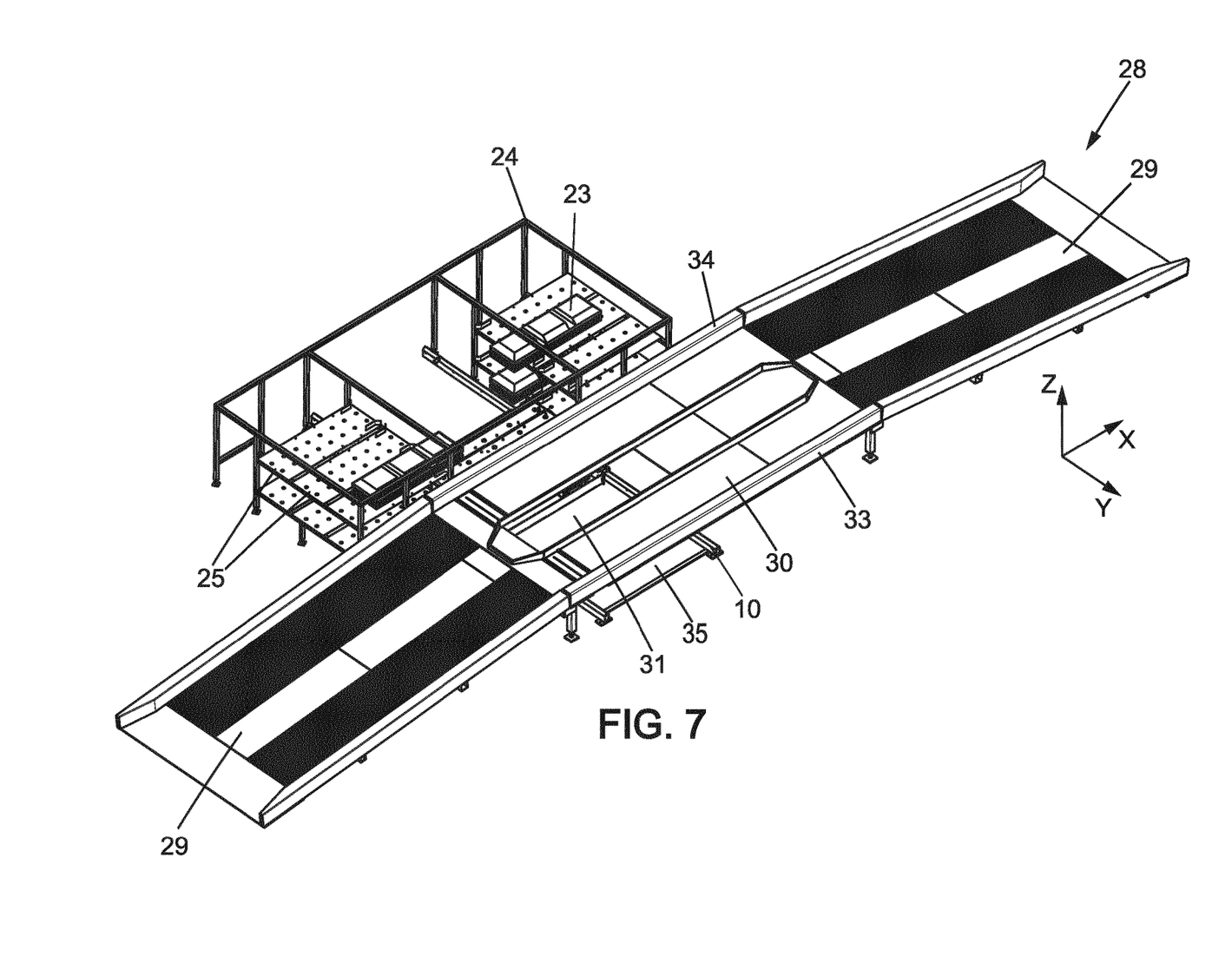
FIG. 7 illustrates a perspective view of a battery exchange station.
Figure 8:
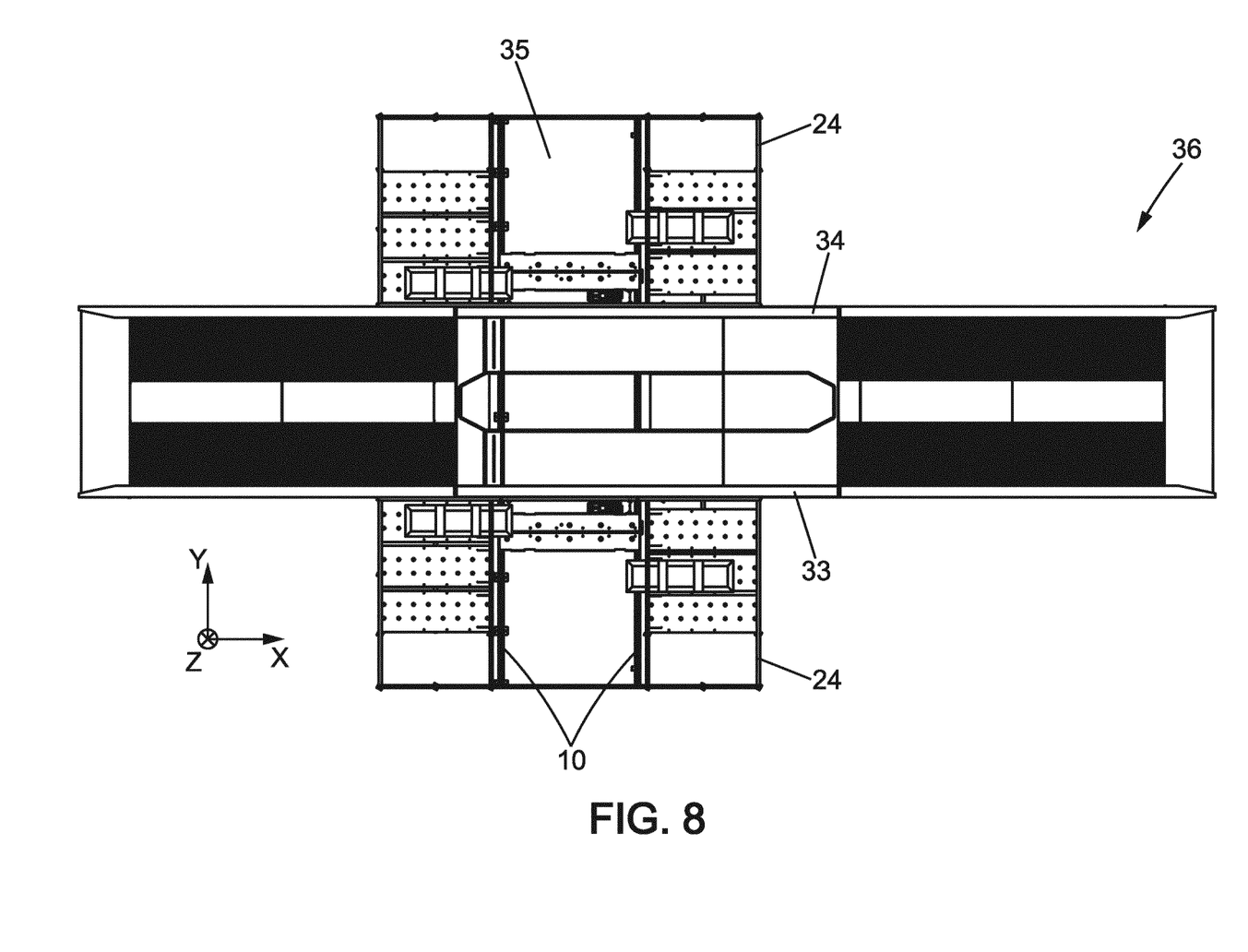
FIG. 8 illustrates a top view of a battery exchange station.

FIGS. 7 and 8 illustrate an exemplary embodiment of a battery exchange station 28 may comprise the battery and charge system 22, a ramp 29 and a vehicle lane 30.

The ramp 29 may be configured to enable an electrical or hybrid vehicle to access a location for battery exchange. Therefore it is a ramp on which an electrical or hybrid vehicle may advance to the location of battery exchange in second direction X. The location for battery exchange may vary depending on the particular vehicle and parameters of the battery block to be exchanged The at least one battery block moving assembly 1 may move in the first direction Y under a vehicle lane 30. The vehicle lane may have an opening 31. The vehicle lane 30 may comprise a first side 33 and a second side 34 spaced from the first side in the first direction Y. The battery exchange station may include several racks close to respectively the first side and/or the second side of the vehicle lane. The at least one rail may extends between the racks.

The vehicle lane opening may be adapted to give a free passage to the battery block when the battery block is lifted in the third direction Z by the lift mechanism of the at least one battery moving assembly. The at least one battery moving assembly may further comprise at least one rail. The at least one rail may extend under the vehicle lane. The at least one battery block moving assembly may be adapted to move the at least one battery block 23 to the position in the first Y and the second X direction horizontally corresponding the opening in the vehicle lane and extend in the third substantially vertical direction Z. The at least one battery block moving assembly may be configured to place the at least one battery block 23 into a battery dock within the electrical vehicle or remove the at least one battery block 23 from the electrical vehicle.

While variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein.

The invention claimed is:

1. A battery block moving assembly, the assembly comprising:
   a trolley having a top side and a bottom side spaced from the top side, the trolley being horizontally movable in a substantially horizontal first direction;
   a platform positioned on the top side of the trolley and comprising a first end, a second end spaced from the first end, and a top surface that extends in a substantially horizontal second direction perpendicular to the first direction between the first and second ends, the top surface is configured to support a battery block thereon;
   a lift mechanism disposed between the trolley and the platform, the lift mechanism configured to move the platform relative to the trolley in a substantially vertical third direction perpendicular to both the first and the second direction; and
   a battery block moving mechanism coupled to the platform, the battery block moving mechanism comprises a moveable pin that extends outwards from the top surface of the platform and a horizontal pin moving mechanism configured to move the moveable pin in the second direction along the top surface of the platform, wherein the pin is configured to engage and move the battery block, wherein the battery block moving mechanism is configured to transfer in the second direction the battery block from/to the top surface of the platform by using the moveable pin to move the battery block alongside the platform in the second direction.

2. The assembly according to claim 1, wherein the battery moving mechanism further comprise a vertical pin moving mechanism configured to move the pin between the extended position and a retracted position, the pin protruding from the top surface of the platform when in an extended position and the pin not protruding from the surface of the platform when in the retracted position.

3. The assembly according to claim 1, wherein the lift mechanism comprises at least one scissor type lift comprising at least one pair of vertical scissor columns, each of the scissor columns comprising at least one pair of arms pivotally movable relative to one another and at least one spring element having one end coupled with the platform and the second end coupled to one of the arms.

4. The assembly according to claim 1, wherein the assembly further comprising a control unit adapted to control the trolley movement in the first direction and/or the second direction and the lift mechanism movement in the third direction.

5. The assembly according to claim 1, wherein the top surface of the platform comprising a plurality of rollers adapted to rollably support the battery block.

6. The assembly according to claim 1, wherein the assembly further comprises a trolley moving mechanism coupled to the trolley and adapted to move the trolley in the first direction.

7. The assembly according to claim 6, wherein the assembly further comprise at least one rail extending in the first direction and the trolley moving mechanism is adapted to move the trolley on the at least one rail in the first direction.

8. The assembly according to claim 7, wherein the trolley further comprises a plurality of wheels adapted to rollably support the trolley on the at least one rail.

9. The assembly according to claim 7, wherein the assembly further comprises two spaced apart parallel rails and the trolley further comprise two sets of wheels arranged on opposite sides of the trolley, wherein the sets of wheels are configured to rollably support the trolley on the two rails.

10. A battery storage and charge system comprising at least one assembly according to claim 6, the system further comprising:
   at least one battery block;
   at least one rack having a plurality of shelves, each shelf of the plurality of shelves being configured to receive and mechanically support the at least one battery block, wherein the trolley moving mechanism of each of the at least one assembly is adapted to move the trolley along the at least one rack, each shelf of the plurality of shelves being open toward the at least one rail in the first direction and the battery block moving mechanism of each of the at least one battery moving assembly being adapted to transfer the at least one battery block from the top surface of the platform to the shelf and from the shelf to the top surface of the platform; and at least one charging unit each adapted to charge and communicate with the at least one battery block when the at least one battery block is received within one of the plurality of shelves.

11. The system according to claim 10, wherein each shelf of the plurality of shelves further comprise at least one battery block guide configured to guide the battery block when being transferred to the shelf.

12. The system according to claim 10, wherein each shelf of the plurality of shelves further comprises a plurality of rollers thereon, the plurality of rollers adapted to rollably support the battery block.

13. The system according to claim 10, wherein each of the at least one battery block has a bottom portion having at least one opening and the at least one opening is sized to accept the pin.

14. The system according to claim 10, wherein the at least one assembly further comprises at least one rail extending in the first direction and the at least one rail forms a pathway extending in the first direction, the system having at least two of the racks separated by the pathway.

15. A battery exchange station comprising the system according to claim 10, the battery exchange station further comprising:
a ramp on which an electric vehicle can advance to the location of battery exchange in the second direction;
a vehicle lane under which the at least one battery block moving assembly moves in the first direction,
wherein the vehicle lane has an opening, the opening being adapted to give free passage to the battery block when the battery block is lifted in the third direction by the lift mechanism of the at least one battery moving assembly.

16. A battery exchange station according to claim 15, wherein the at least one battery moving assembly further comprise at least one rail and the at least one rail extends under the vehicle lane.

17. The station of claim 15, wherein the at least one battery block moving assembly is adapted to move the at least one battery block to the position in the first and the second direction horizontally corresponding the opening in the vehicle lane and extend in the third substantially vertical direction, the at least one battery block moving assembly being configured to place the at least one battery block into a battery dock within the electrical vehicle or remove the at least one battery block from the electrical vehicle.

18. The station of claim 16 or 17, wherein the vehicle lane comprises a first side and a second side spaced from the first side in the first direction, wherein the battery exchange station includes several racks close to respectively the first side and/or the second side of the vehicle lane, and the at least one rail extends between the racks.

* * * * *